Oct. 28, 1924.
G. Q. LEWIS
1,512,940
FRICTION SHOCK ABSORBING MECHANISM
Original Filed Aug. 31, 1922    2 Sheets-Sheet 1
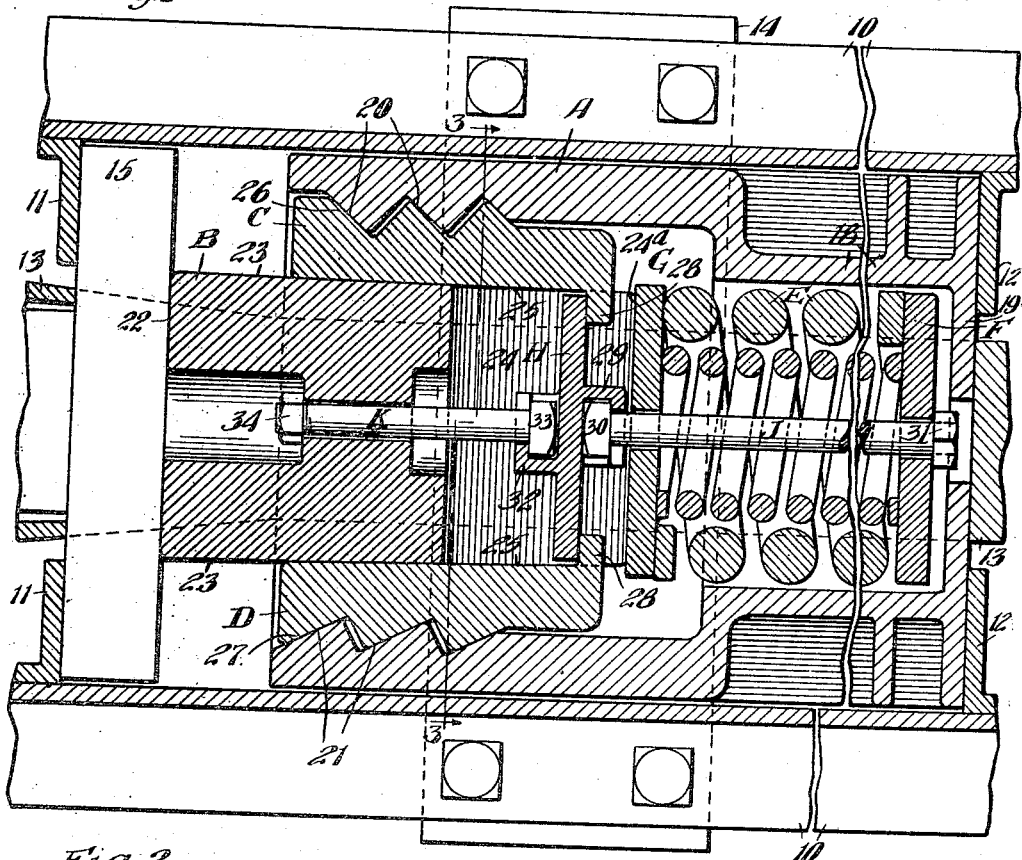
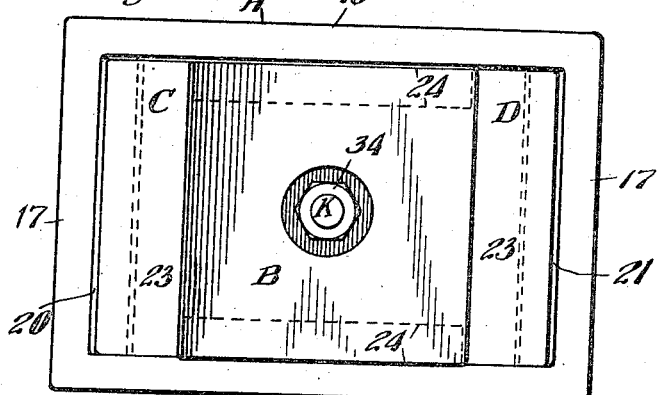
Witnesses
Wm. Geiger
Inventor
Goodrich Q. Lewis
By Geo. I. Haight
His Atty.

Oct. 28, 1924.
G. Q. LEWIS
1,512,940
FRICTION SHOCK ABSORBING MECHANISM
Original Filed Aug. 31, 1922    2 Sheets-Sheet 2
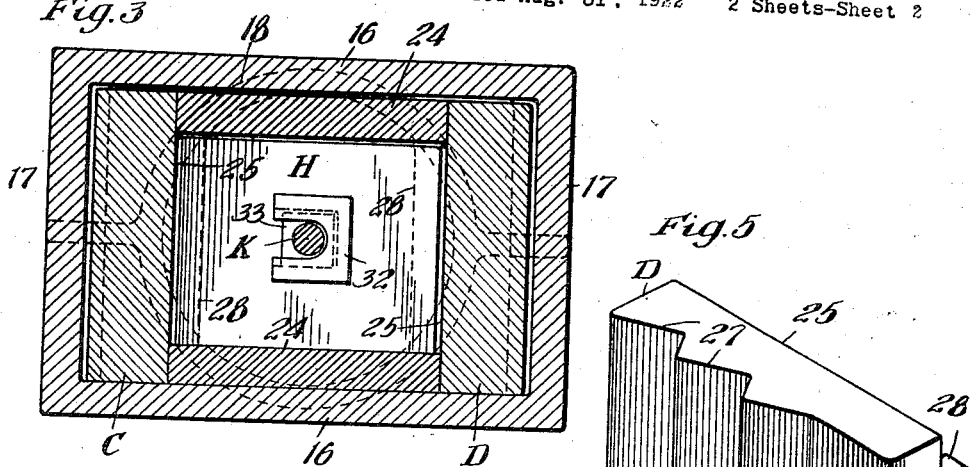
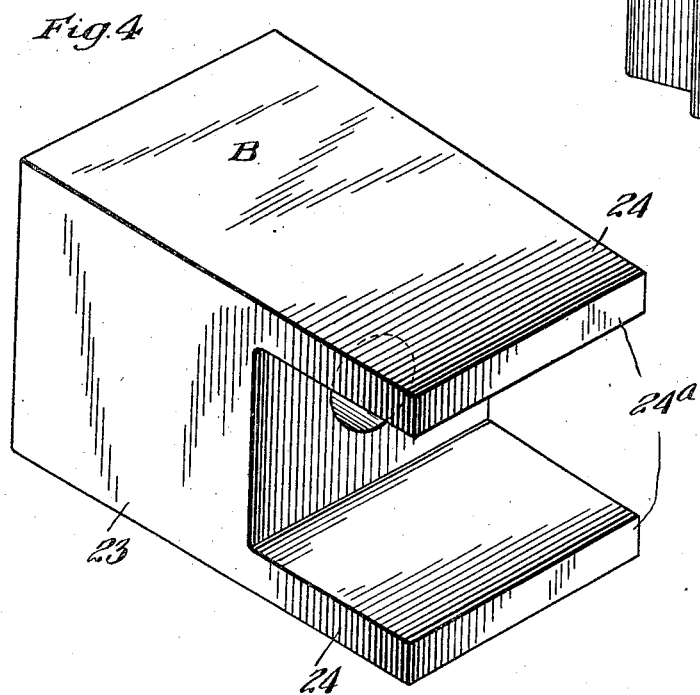
Witnesses
Wm. Geiger
Inventor
Goodrich Q. Lewis
By Geo. I. Haight
His Atty.

Patented Oct. 28, 1924.

1,512,940

UNITED STATES PATENT OFFICE.

GOODRICH Q. LEWIS, OF WHEATON, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed August 31, 1922, Serial No. 585,441. Renewed June 7, 1924.

*To all whom it may concern:*

Be it known that I, GOODRICH Q. LEWIS, a citizen of the United States, residing at Wheaton, in the county of Du Page and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism especially adapted for railway draft riggings wherein are obtained high capacity and certain release, developed principally by friction elements of simple and economical construction.

More specifically, an object of the invention is to provide a friction mechanism of the character above broadly indicated and wherein the mechanism is of that type employing a friction plunger with gripping elements cooperable therewith, means being employed to produce a keen angle gripping effect and a blunt angle releasing effect.

In the drawings forming a part of this specification, Figure 1 is a horizontal, longitudinal, sectional view, partly broken away, of a portion of a railway draft rigging showing my improvements in connection therewith. Figure 2 is a front end elevation of the friction shock absorbing mechanism proper. Figure 3 is a vertical transverse sectional view corresponding to the section line 3—3 of Figure 1. And Figures 4 and 5 are detail perspectives of the friction plunger and one of the friction gripping elements, respectively.

In said drawings, 10—10 indicate channel draft sills of the usual type, the same having front stop lugs 11 and rear stop lugs 12 secured to the inner faces thereof. The shock absorbing mechanism proper is operatively associated with a draw-bar by means of a hooded cast yoke 13, said yoke and the parts therewithin being supported in operative position by a detachable saddle plate 14. A front follower 15 of ordinary form is employed with the shock absorbing mechanism proper.

The improved shock absorbing mechanism proper, as shown, comprises, broadly, a combined container and spring cage casting A; a friction plunger B; a pair of friction gripping elements C and D; a spring resistance E; two spring followers F and G; a locking plate H; and two retainer bolts J and K.

The casting A, as shown, is of rectangular cross section at its outer or front end, the same having top and bottom walls 16—16 and side walls 17—17. Rearwardly of the container section defined by the walls 16 and 17, the casting A is made of reduced cross section as indicated at 18 to provide the spring cage, said casting having an integral rear wall 19 laterally extended to cooperate with the lugs 12 in the manner of the usual rear follower. Said back wall 19 is suitably braced by ribs and flanges as clearly indicated in Figure 1.

The inner faces of the side walls 17—17 are formed with a plurality of longitudinally arranged wedge faces 20 and 21. The series of wedge faces 20 is inclined rearwardly and inwardly toward the axis of the mechanism at a relatively blunt angle, whereas the series of wedge faces 21 is extended rearwardly and inwardly toward the axis of the mechanism at a comparatively keen angle, for the purpose hereinafter described. Preferably there are three wedge faces in each of the series 20 and 21.

The plunger B, which is adapted to transmit the pressure from the drawbar during a compression stroke in buff and also during a draft action, is preferably in the form of a relatively heavy block of substantially rectangular cross section, the same having an outer face 22 bearing directly on the follower 15. Said friction plunger B is provided on opposite sides thereof with longitudinally extending flat friction surfaces 23—23 preferably slightly inwardly tapered. From its inner end, the plunger B has extended therefrom top and bottom flanges 24—24 as shown in Figures 1, 3 and 4, said flanges 24 being of sufficient length to have their inner edges 24$^a$ disposed inwardly of the inner ends of the gripping elements G and D, as shown in Figure 1, said inner edges 24$^a$ bearing upon the spring follower G.

The two friction gripping elements C and D are of substantially like construction, each having an inner longitudinally extending friction face 25 cooperable with the corresponding friction face 23 of the plunger B. Each of the elements C and D is provided with a series of wedge faces 26 and 27, respectively, inclined to correspond and cooperate with the container wedge faces 20 and 21, respectively. At their inner ends, the elements C and D are formed with inturned flanges 28—28 to provide a bearing for the locking plate H.

The locking plate H is provided on its inner or rear side with an overhanging slotted flange 29 under which is hooked the head 30 of the retainer bolt J. The latter passes through a suitable opening in the spring follower G and through another opening in the follower F, the latter being held on the bolt J by the nut 31. In this manner, it will be observed that the spring follower F is held in fixed relation with respect to the locking plate H and hence, as the plunger B is forced inwardly of the friction elements C and D, the spring E will be compressed against the follower F as the follower G moves toward the follower F.

On its front side, the plate H is provided with a similar overhanging slotted flange 32 under which is hooked the head 33 of the bolt K, the latter passing through a suitable opening in the plunger B and locked with the latter by means of the nut 34. By the system of bolts J and K and locking plate H, it will be observed that the plunger B and gripping elements C and D are always held taut and compensation for wear automatically provided for.

The operation is as follows. As the plunger B is forced inwardly of the container A, the spring E will be compressed as hereinbefore described, and tension will be exerted on the gripping elements C and D through the locking plate H. As the plunger B travels inwardly, the friction elements C and D will tend to move inwardly of the container not only under the influence of the spring tension as above mentioned but also by reason of the frictional drag occurring between the elements C and D on the one hand and the plunger B on the other hand. The blunt angle wedge faces 20 and 26 will preferably be made at such an angle as to eliminate any substantial wedging action or travel on each other during a compression stroke but on acount of the keen angle arrangement of the wedge faces 21 and 27, a very tight gripping effect will be produced on the plunger. This gripping effect will be augmented by reason of the taper of the friction surfaces 23—23 of the plunger B. While in actual practice, the taper will not be made very great, nevertheless, it will be sufficient to compel a slight lateral separation of the gripping elements C and D and this is readily taken care of by the blunt angle faces 20 and 26, the latter acting as compensating angles during the compression stroke. Upon removal of the actuating force, it is evident that the spring E will react through the follower G and flanges 24 with the plunger B to force the latter outwardly with respect to the gripping elements C and D. The angle of the faces 20 and 26 is made blunt and of sufficient bluntness to prevent all possibility of sticking or jamming, whereas the collapse of the gripping elements C and D is readily effected initially between the element C and the container A, thus insuring certain release.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with a container; of a pressure-transmitting friction member; gripping elements between said friction member and the container; cooperable wedge faces on said elements and the container, certain of said wedge faces being of keener angle than others; and a spring resistance.

2. In a friction shock absorbing mechanism, the combination with a container; of a pressure-transmitting friction member; gripping elements between said friction member and the container; cooperable wedge faces on said elements and the container, certain of said wedge faces being of keener angle than others; a spring resistance; and means between said friction member, said elements and the spring resistance to yieldingly resist relative movement between the friction member and said elements.

3. In a friction shock absorbing mechanism, the combination with a container; of a centrally disposed friction plunger; opposed gripping elements interposed between said plunger and the container; cooperable wedge faces on said gripping elements and the container, certain of said wedge faces being of keener angle than others; and a spring resistance.

4. In a friction shock absorbing mechanism, the combination with a column-load-sustaining member; of a pressure-transmitting friction member; friction gripping elements interposed between said friction member and the load-sustaining member; cooperable wedge faces on said gripping elements and load-sustaining member, certain of said faces being of keener angle than others; and a spring resistance disposed within the said load-sustaining member.

5. In a friction shock absorbing mechanism, the combination with a container; of a pressure-transmitting friction member having inwardly tapered friction surfaces; friction gripping elements between said member and container, said elements having cooperating friction surfaces; and wedging means between said gripping elements and the container, certain of said wedging means being of keen angle high capacity gripping form and the others of blunt angle releasing type; and a spring resistance.

6. In a friction shock absorbing mechanism, the combination with a container; of a pressure-transmitting friction plunger having opposed longitudinally extending friction surfaces tapered inwardly; of friction gripping elements each having a friction surface cooperable with a friction surface of the plunger, said gripping elements being in opposed relation; wedging means between each friction gripping element and the container, certain of said wedging means being of keen angle high capacity formation and others of blunt angle releasing formation; and a spring resistance.

7. In a friction shock absorbing mechanism, the combination with a container having opposed wedge faces on the interior thereof, certain of said wedge faces extending at a relatively keen angle with respect to the center line of the container and others at a blunt releasing angle; of opposed friction gripping elements having cooperable wedge faces; a friction plunger disposed between the gripping elements and cooperable therewith; a spring resistance; and means interposed between said plunger and one end of the spring resistance for compressing the latter upon movement of the plunger inwardly relatively to the container.

8. In a friction shock absorbing mechanism, the combination with a container having opposed sets of wedge faces on the interior thereof; of opposed friction gripping elements having wedge faces cooperable with the wedge faces of the container; a friction plunger cooperable with said gripping elements; a spring resistance; and means interposed between one end of said spring resistance and the gripping elements for maintaining a fixed relation between said end of the spring resistance and the gripping elements.

9. In a friction shock absorbing mechanism, the combination with a casting having an integral spring cage formed therein, said casting having also opposed sets of wedge faces on the interior thereof, certain of said wedge faces extending at a relatively keen angle and others at a relatively blunt releasing angle with respect to the axis of the mechanism; opposed friction gripping elements having wedge faces cooperable with the wedge faces of said casting, said gripping elements having inturned flanges at their inner ends; a friction plunger cooperable with said gripping elements, said plunger and gripping elements having friction surfaces tapered inwardly of the mechanism; a locking plate supported on said flanges of the gripping elements; a spring resistance; a follower at the end of said spring resistance remote from the gripping elements; connecting means between said locking plate and said follower; and means interposed between said plunger and the opposite end of said spring resistance for compressing the latter upon movement of the friction plunger inwardly with respect to the gripping elements.

10. In a friction shock absorbing mechanism, the combination with a shell; of friction gripping elements having wedge engagement with the shell; a pressure transmitting friction plunger cooperating with said gripping elements; a spring resistance for said plunger; and means interposed between said gripping elements and spring resistance normally urging said elements inwardly of the shell.

11. In a friction shock absorbing mechanism, the combination with a shell having wedge faces on the interior thereof; of a plurality of friction gripping elements having wedge faces cooperating with the wedge faces of the shell; a pressure-transmitting friction plunger interposed between and cooperating with said gripping elements; a spring resistance coacting with said plunger at one end; and means interposed between the opposite end of said spring resistance and said gripping elements arranged to urge the latter inwardly of the shell.

12. In a friction shock absorbing mechanism, the combination with a shell having opposed sets of wedge faces on the interior thereof; of opposed friction gripping elements having wedge faces cooperable with the wedge faces of the shell; a tapering friction plunger cooperable with said gripping elements; a spring resistance having one end coacting with said plunger; and means interposed between the opposite end of said spring resistance and the gripping elements for maintaining a fixed relation between said last named end of the spring resistance and the gripping elements.

In witness that I claim the foregoing I have hereunto subscribed my name this 15th day of August, 1922.

GOODRICH Q. LEWIS.

Witnesses:
UNA C. GRIGSBY,
ANN BAKER.